United States Patent
Choudhury

(10) Patent No.: US 8,341,277 B2
(45) Date of Patent: Dec. 25, 2012

(54) SYSTEM AND METHOD FOR CONNECTING CLOSED, SECURE PRODUCTION NETWORK

(75) Inventor: Ziyad A. Choudhury, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 11/772,880

(22) Filed: Jul. 3, 2007

(65) Prior Publication Data

US 2009/0013030 A1    Jan. 8, 2009

(51) Int. Cl.
G06F 15/16    (2006.01)

(52) U.S. Cl. ........ 709/229; 709/217; 709/219; 709/227; 709/200

(58) Field of Classification Search ................... 709/229, 709/217, 219, 227
See application file for complete search history.

(56) References Cited

U.S. PATENT DOCUMENTS

| | | | | |
|---|---|---|---|---|
| 5,907,494 | A * | 5/1999 | Dangelo et al. | 703/1 |
| 5,982,507 | A * | 11/1999 | Weiser et al. | 358/438 |
| 6,584,454 | B1 * | 6/2003 | Hummel et al. | 705/59 |
| 6,718,392 | B1 * | 4/2004 | Krause | 709/238 |
| 6,751,729 | B1 * | 6/2004 | Giniger et al. | 713/153 |
| 6,772,034 | B1 | 8/2004 | Shi et al. | |
| 6,792,463 | B1 | 9/2004 | Lamberton et al. | |
| 6,981,041 | B2 * | 12/2005 | Araujo et al. | 709/224 |
| 6,996,841 | B2 * | 2/2006 | Kadyk et al. | 726/12 |
| 7,133,915 | B2 * | 11/2006 | Benejam et al. | 709/224 |
| 7,143,136 | B1 * | 11/2006 | Drenan et al. | 709/204 |
| 7,188,179 | B1 * | 3/2007 | Hanson et al. | 709/227 |
| 7,260,648 | B2 * | 8/2007 | Tingley et al. | 709/245 |
| 7,337,221 | B2 * | 2/2008 | Radi et al. | 709/223 |
| 7,359,933 | B1 * | 4/2008 | Polen et al. | 709/203 |
| 7,424,533 | B1 * | 9/2008 | Di Benedetto et al. | 709/226 |
| 7,451,118 | B2 * | 11/2008 | McMeen et al. | 705/401 |
| 7,467,227 | B1 * | 12/2008 | Nguyen et al. | 709/239 |
| 7,555,421 | B1 * | 6/2009 | Beckett et al. | 703/23 |
| 7,647,403 | B2 * | 1/2010 | Gray | 709/225 |
| 7,849,505 | B2 * | 12/2010 | Satterlee et al. | 726/15 |
| 7,860,978 | B2 * | 12/2010 | Oba et al. | 709/227 |
| 8,010,651 | B2 * | 8/2011 | DeSantis et al. | 709/223 |
| 8,085,690 | B1 * | 12/2011 | Leelanivas et al. | 370/255 |
| 8,121,126 | B1 * | 2/2012 | Moisand et al. | 370/392 |
| 2002/0002622 | A1 * | 1/2002 | Vange et al. | 709/245 |
| 2002/0069369 | A1 * | 6/2002 | Tremain | 713/201 |
| 2002/0138628 | A1 * | 9/2002 | Tingley et al. | 709/227 |
| 2002/0198964 | A1 | 12/2002 | Fukazawa et al. | |

(Continued)

OTHER PUBLICATIONS

Notice of Allowance dated Dec. 13, 2010 in U.S. Appl. No. 11/970,724.

(Continued)

Primary Examiner — Backhean Tiv
Assistant Examiner — Anthony Mejia
(74) Attorney, Agent, or Firm — Wenjie Li; Roberts Mlotkowski Safran & Cole, P.C.

(57) ABSTRACT

A system and method for providing connectivity to a closed, secure production network, and computer program products for executing the same and, more particularly, to a system and method for creating a virtual network to provide communication with remote tools. The system includes a server configured to create a virtual network for tools in a production facility and provide authentication and tool routing information to a client in order to gain access to the tools in the virtual network. The virtual network isolates each tool of the tools from each other.

21 Claims, 3 Drawing Sheets

U.S. PATENT DOCUMENTS

| | | | |
|---|---|---|---|
| 2002/0198965 A1* | 12/2002 | Kraft | 709/219 |
| 2003/0065676 A1* | 4/2003 | Gbadegesin et al. | 707/104.1 |
| 2003/0101245 A1* | 5/2003 | Srinivasan et al. | 709/221 |
| 2003/0191799 A1* | 10/2003 | Araujo et al. | 709/203 |
| 2003/0220768 A1 | 11/2003 | Perry et al. | |
| 2004/0010562 A1* | 1/2004 | Itonaga | 709/213 |
| 2004/0024882 A1* | 2/2004 | Austin et al. | 709/227 |
| 2004/0073668 A1* | 4/2004 | Bhat et al. | 709/225 |
| 2004/0255161 A1 | 12/2004 | Cavanaugh | |
| 2005/0076246 A1* | 4/2005 | Singhal | 713/201 |
| 2005/0172156 A1* | 8/2005 | Gbadegesin et al. | 713/201 |
| 2005/0188006 A1* | 8/2005 | Fujibayashi | 709/203 |
| 2005/0265252 A1* | 12/2005 | Banerjee et al. | 370/252 |
| 2005/0273849 A1* | 12/2005 | Araujo et al. | 726/12 |
| 2005/0283615 A1* | 12/2005 | Chakravarthi et al. | 713/182 |
| 2006/0041637 A1* | 2/2006 | Jerrard-Dunne | 709/219 |
| 2006/0112188 A1* | 5/2006 | Albanese et al. | 709/238 |
| 2006/0136720 A1* | 6/2006 | Armstrong et al. | 713/164 |
| 2006/0143244 A1 | 6/2006 | Chia | |
| 2007/0078962 A1* | 4/2007 | Donnelli et al. | 709/223 |
| 2007/0140250 A1* | 6/2007 | McAllister et al. | 370/392 |
| 2007/0180493 A1* | 8/2007 | Croft et al. | 726/2 |
| 2007/0214265 A1* | 9/2007 | Zampiello et al. | 709/226 |
| 2007/0226241 A1* | 9/2007 | Ng et al. | 707/102 |
| 2008/0005250 A1* | 1/2008 | Oksum | 709/206 |
| 2008/0034414 A1* | 2/2008 | Mao et al. | 726/13 |
| 2008/0040491 A1* | 2/2008 | Minodier et al. | 709/229 |
| 2008/0040773 A1* | 2/2008 | AlBadarin et al. | 726/1 |
| 2008/0082640 A1* | 4/2008 | Chang et al. | 709/220 |
| 2008/0098411 A1* | 4/2008 | Dirstine et al. | 719/327 |
| 2008/0141360 A1* | 6/2008 | Hicks et al. | 726/15 |
| 2008/0162705 A1* | 7/2008 | Cai et al. | 709/228 |
| 2008/0222238 A1* | 9/2008 | Ivanov et al. | 709/202 |
| 2008/0320143 A1* | 12/2008 | Di Benedetto et al. | 709/226 |
| 2009/0094364 A1* | 4/2009 | Stevens et al. | 709/226 |
| 2009/0213859 A1* | 8/2009 | De Silva et al. | 370/395.53 |
| 2009/0241108 A1* | 9/2009 | Edwards et al. | 718/1 |
| 2010/0274910 A1* | 10/2010 | Ghanaie-Sichanie et al. | 709/229 |
| 2011/0301970 A1* | 12/2011 | Bae et al. | 705/2 |
| 2012/0017001 A1* | 1/2012 | Braddy et al. | 709/229 |

OTHER PUBLICATIONS

Office Action dated Jun. 28, 2010 in U.S. Appl. No. 11/970,724.

* cited by examiner

SYSTEM AND METHOD FOR CONNECTING CLOSED, SECURE PRODUCTION NETWORK

FIELD OF THE INVENTION

The invention generally relates to a system and method for providing connectivity to a closed, secure production network, and computer program products for executing the same and, more particularly, to a system and method for creating a virtual network to provide communication with remote tools.

BACKGROUND OF THE INVENTION

Automated IC fabrication facilities (Fabs), such as a facility for processing 300 mm wafers, may include many different types of tools for the fabrication of semiconductor devices. These tools typically include proprietary information specific to certain vendors. For this reason, access to each of the tools are provided on their own secure local server. That is, each tool is accessible through its own server to ensure that the vendor data stays proprietary. In this way, it is not possible to gain access to tools through another vendor's server.

In such automated facilities, the basic goals are generally the same: to operate the overall facility with very high degree of efficiency, quality and flexibility, in order to maximize productivity and return-on-investment. Often times, this in turn requires optimizing product mix and output, while minimizing downtime. However, minimizing downtime in an active production system environment can be challenging, especially since data for each tool can be only accessed locally on its own server. For example, a vendor authorized user must be physically present at the tool facility to access the tool and its data. Thus, maintenance, repair, etc. on the tool can consume valuable production time.

In addition, new and updated applications used in facilitating the manufacturing processes in a fabrication facility oftentimes interfere with production during installation and testing. For example, MES tools (e.g., IBM's® SiView products) utilize databases to store real time data and communicate information to automated systems in the facility. When updating/testing MES and supporting applications (e.g., Murata's® Automated Material Handling System), access to real time data and supporting applications need to be enabled on a live network. However, when these test systems access the MES and interact with production activities, there may be adverse effects on the daily manufacturing quota (e.g., degradation of the availability commitment of the MES).

Accordingly, there exists a need in the art to overcome the deficiencies and limitations described hereinabove.

SUMMARY OF THE INVENTION

In a first aspect of the invention, a system comprises a server configured to create a virtual network for tools in a production facility and provide authentication and tool routing information to a client in order to gain access to the tools in the virtual network. The virtual network isolates each tool of the tools from each other.

In another aspect of the invention, a method comprises receiving client credentials and tool access information. The tool access information is associated with tools residing in a private, non-advertised network. The method further comprises creating a virtual network where each tool residing in the private, non-advertised network is an isolated node and sending authentication and routing information to a client in order to permit access to a tool on an isolated node in the virtual network. The method also provides access to the tool in the virtual network.

In yet another aspect of the invention, a computer program product creates a virtual network in a production facility for private, non-advertised tools. The computer program product includes instructions for causing a computer to implement a method, comprising: creating a virtual network where each tool on a private non-advertised network is an isolated node; sending authentication and routing information to a client for a specific tool or group of tool in the private non-advertised network; and providing access to the tool in the virtual network.

DETAILED DESCRIPTION OF THE INVENTION

Figure 1:
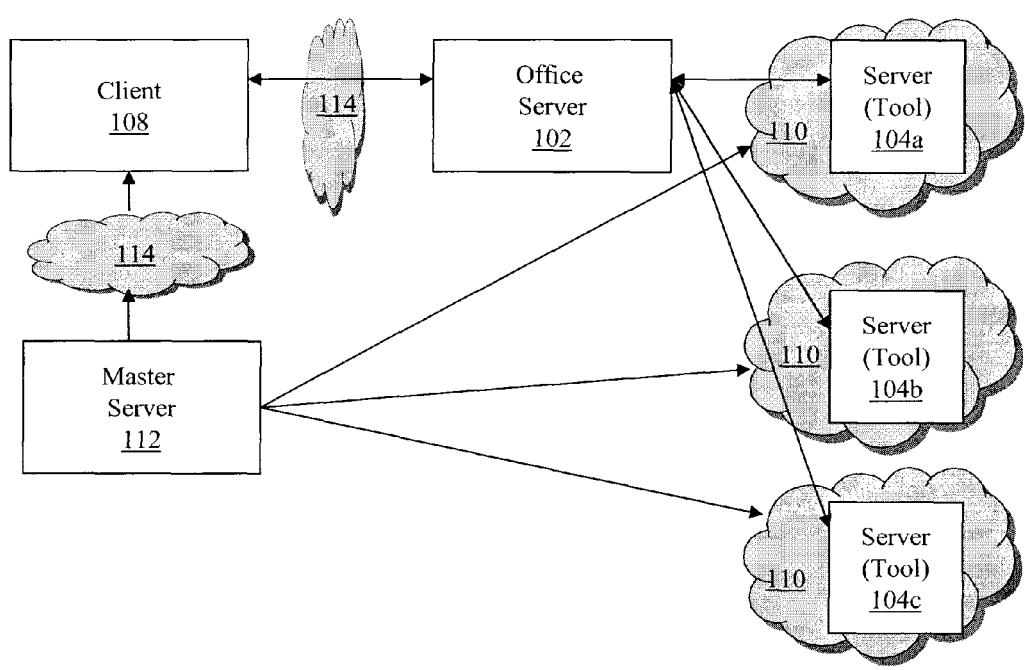
FIG. 1 shows an illustrative environment for implementing the processes in accordance with the invention.

The invention generally relates to a method and system for providing communication connectivity for a closed, secure production network, and computer program products for executing the same. More particularly, the invention relates to a system and method for creating a virtual network for providing remote communication with tools. As such, in embodiments, the secure network provides connectivity for connecting production systems and networks in a manufacturing environment such that performance data can be securely extracted for testing and compliance of production system applications and upgrades. Real time production data is accessed without impacting production systems or environments.

More specifically, in embodiments, a network configuration server engages a master server (also known as a proxy server) that sets up a virtual network amongst a client and various tool networks and/or servers. The tools and processes thereon may be vendor specific and proprietary to the vendors. The virtual network may be set up using standard Multiprotocol Label Switching (MPLS) label distribution technology.

After authentication, the network configuration server, aware of the virtual network, can communicate natively with the tools, making the client, network configuration server and the tools communicate as if they are next to each other, while the client and the tools (and even the network configuration server) are actually remotely located from one another. As such, in embodiments, the client can remotely access each network environment associated with a tool, in a secure manner. Also, in embodiments, the virtual network will isolate each independent node, i.e., tool, such that routing between nodes will be independent from each other. In this way, a client will not be able to gain access to a node, i.e., tool, in which they do not have authority to access.

Thus, although a fabrication network (e.g., a network of tools) resides on a private, non-advertised network that is typically accessible through internal test, production, and offline room networks, by implementing the system and method of the invention, the computer host systems residing on the offline room network installed with NFS (network file system) mounting, AFC cell, and VNC (Virtual Network Computing) capabilities can be accessed by a remote client using a virtual network to gain access to the tools. VNC is a graphical (GUI) desktop sharing system which uses RFB (Remote FrameBuffer) protocol to remotely control another computer. VNC transmits keyboard and mouse events from one computer to another, relaying the graphical screen updates back in the other direction, over a network. VNC is platform-independent, i.e., a VNC viewer on any operating system can usually connect to a VNC server on any other operating system. Popular uses for this technology include remote technical support and accessing files on remote platforms.

In embodiments, the system and method of the present invention is configured to interface with many different types of tools and associated networks, including Agilent™ Parametric testers, MOSAID™ testers, and PDF™ Process characterization yield learning systems for configuration parameters and recipe management of systems that do not interface with SiView™. As discussed herein, each one of the tools will be an independent node in the virtual network, individually accessible by a client with the proper authentication. SiView™ is a manufacturing execution system that IBM has integrated with its fabrication processes. SiView leverages information from DB2 to automatically control each step of the fabrication process in the 300 mm wafer fabrication process. IBM WebSphere® MQ provides the messaging platform that enables DB2 to exchange information with the production tools and other application programs used to run the fabrication processes.

As to security measures, the system and method of the invention is configured to:
Firewall the Offline room network;
Block off any and all network traffic going to the private network from systems in the offline room; and
Provide separate virtual networks with each vendor group tools, thus isolating each group of tools from one another. This ensures that each group of tools or individual tools are accessible independent from one another ensuring security of the entire system.

System Environment

Referring now to FIG. 1, a portion of an exemplary system upon which the secure production network may be implemented is described. The system of FIG. 1 may be a manufacturing facility, e.g., semiconductor manufacturing facility for 300 mm wafers. The system of FIG. 1 includes an office server 102 (also referred to herein as "host system") in communication with at least one server associated with a tool such as, for example, Agilent™ Parametric testers, MOSAID™ testers, and PDF™ Process characterization yield learning systems, generally referred to as reference numerals 104a, 104b, 104c. While only three tools 104a-104c are generally shown in the system of FIG. 1, it will be understood that the secure production network may provide an infrastructure consisting of any number or combination of tools in a production facility (e.g., engineering test network, vendor tool test network, various application support networks, etc.). The tools are isolated from a client 108 and each other via a secure, virtual network 110 created by master server 112. The virtual network may be created using standard MPLS. Also, in exemplary embodiments, the servers and tools are isolated from one another via a firewall 114 thereby restricting access thereto.

In implementation, by implementing the system and method of the invention, the office server has information related to each of the virtual networks in its memory and the type of servers that are in each of the virtual networks. The office server is also aware of the clients that are allowed to access each type of tool virtual network. Any server and or service that needs to access the test tools can engage a web browser authentication against the office server. Once the client is authenticated using either LDAP or some type of directory services, then the office server enables all the routers between the server and the virtual network with appropriate labels enabling the server to be part of the virtual network.

The servers 102, 104a-104c, and 112 may be implemented using one or more computer processing devices operating in response to computer programs stored in a storage medium accessible by the servers 102, 104a-104c, and 112. The server 102 may operate as a network server (e.g., a web server) to communicate with the other servers. As indicated above, servers 102 and 112 may include firewalls 114, respectively, to prevent unauthorized access to the servers 102 and 112 and enforce any limitations on authorized access. The firewalls 114 may be implemented using conventional hardware and/or software as is known in the art.

Figure 2:
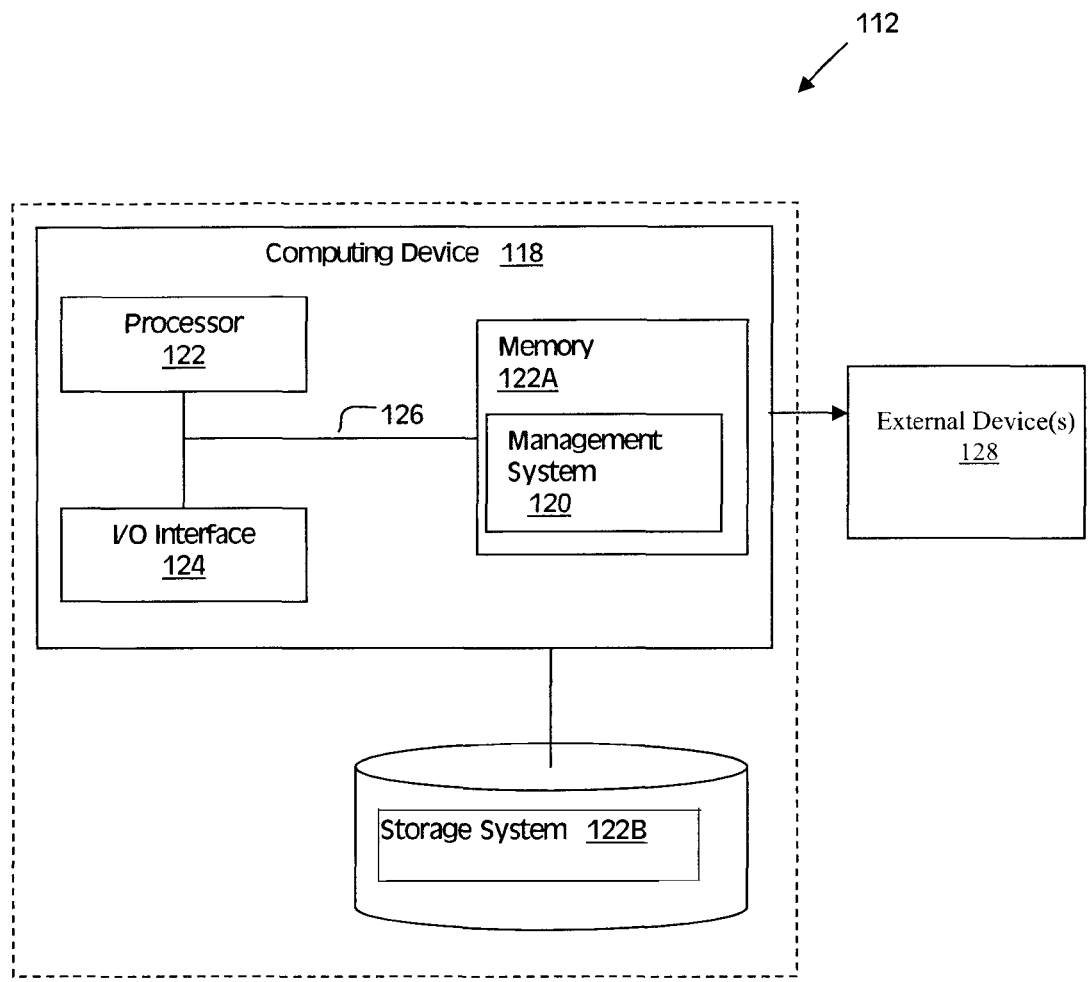
FIG. 2 shows a configuration in accordance with exemplary embodiments of the invention.

As indicated above, the master server 112 executes one or more computer programs to create and provide secure network functions in a virtual network. More specifically, FIG. 2 shows an illustrative master server 112 for managing the processes in accordance with the invention. The master server 112 includes a computing device 118 that comprises a management system 120. The management system 120 includes program code to allow master server 112 to create the virtual network, allowing a client access to tools at a remote location. More specifically, master server 112 functions to establish one or more virtual networks that include and allow access to specified network tools. The virtual network is designed to isolate one or more tools from other tools. By isolating network tools, the various network tools and processes enable access to real production data while securely maintaining the integrity of data in the production environment. Thus, by implementing the system and method of the invention, it is now possible to securely access the servers for each of the tools at a remote location.

The computing device 118 includes a processor 122, a memory 122A, an input/output (I/O) interface 124, and a bus 126. The memory 122A can include local memory employed during actual execution of program code, bulk storage, and cache memories which provide temporary storage of at least some program code in order to reduce the number of times code must be retrieved from bulk storage during execution. Further, computing device 118 is in communication with an external I/O device/resource 128 and a storage system 122B. The external I/O device/resource 128 may be keyboards, displays, pointing devices, etc. Thus, the I/O device 128 can comprise any device that enables an individual to interact with computing device 118 and/or any device that enables computing device 118 to communicate with one or more other computing devices using any type of communications link.

The processor 122 executes computer program code, which is stored in memory 122A and/or storage system 122B. The computer program code is configured to execute the processes described herein. While executing computer program code, processor 122 can read and/or write data to/from memory 122A, storage system 122B, and/or I/O interface 124. The bus 126 provides a communications link between each of the components in computing device 118. Thus, computing device 118 shown in FIG. 1 may be provided on any distributed network.

The computing device 118 can comprise any general purpose-computing article of manufacture capable of executing computer program code installed thereon (e.g., a personal computer, server, handheld device, etc.). For the purposes of this description, the article of manufacture can be a computer-usable or computer readable medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

It is understood that computing device 118 is only representative of various possible equivalent-computing devices that may perform the processes described herein. To this extent, in embodiments, the functionality provided by computing device 118 can be implemented by a computing article of manufacture that includes any combination of general and/or specific purpose hardware and/or computer program code. In each embodiment, the program code and hardware can be created using standard programming and engineering techniques, respectively.

Further, while performing the processes described herein, one or more computing devices can communicate with one or more other computing devices using any type of communications link. For example, the computing device 118 can communicate with the client, office server, etc. The communications link can comprise any combination of wired and/or wireless links; any combination of one or more types of networks (e.g., the Internet, a wide area network, a local area network, a virtual private network, etc.); and/or utilize any combination of transmission techniques and protocols.

Embodiments of Processes

Figure 3:
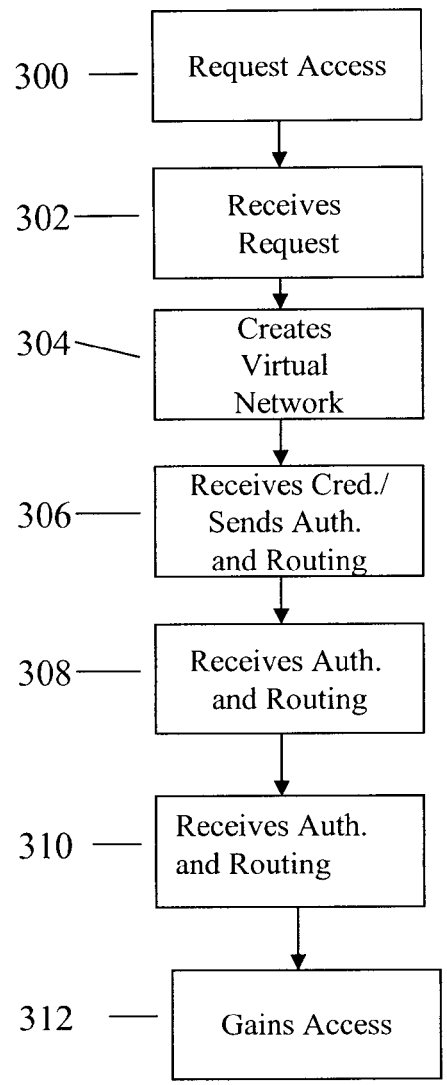
FIG. 3 shows a flow diagram implementing processes in accordance with the invention.

FIG. 3 shows a flow diagram describing a process for providing a secure virtual network in accordance with exemplary embodiments of the invention. FIG. 3 may equally represent a high-level block diagram of components of the invention implementing the steps thereof. The steps of FIG. 3 may be implemented on computer program product accessible from a computer-usable or computer-readable medium providing program code for use by or in connection with a computer or any instruction execution system, in combination with the appropriate hardware as discussed with reference to FIG. 2. Additionally, the invention can take the form of an entirely hardware embodiment or an embodiment containing both hardware and software elements (any of which is referred generally as "management system"). The hardware and software elements include a computer infrastructure configured to implement the functionality of the present invention.

At step 300, the client requests access to a remote tool. At step 302, the office server receives the request from the client and presents the credentials of the client to the master server. The office server also provides to the master server the requested tool in which the client wishes to access. At step 304, the master server creates the virtual network. At step 306, the master server receives the credentials and sends authentication and routing information to the client. In an alternative embodiment, this information can be sent to the client through the office server.

At step 308, the client receives the authentication and routing information and sends this information to the office server. At step 310, the office server receives the authentication and routing information. At step 312, the office server gains access to the particular tool via the virtual network and allows the client to communicate with the tool (tool server). At this stage, the client can access data from the specific tool, as well as upload data to the tool in which authority was granted. The communications between the servers and clients may be through TCP/IP communications, LAN, WAN, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system, comprising:
  a server implemented with a processor and configured to create a plurality of virtual networks such that a separate virtual network is created for each separate individual tool or group of tools in a production facility, wherein each separate individual tool or group of tools is vendor specific and proprietary to the vendor;
  another server configured to:
    store information related to each of the plurality of virtual networks and each separate individual tool or group of tools in the corresponding virtual network of the plurality of virtual networks, and which virtual network for each separate individual tool or group of tools a client is authorized to access;
    receive a request from the client to gain access to at least one of the separate individual tool or group of tools;
    access the at least one of the separate individual tool or group of tools via a corresponding virtual network of the plurality of virtual networks; and
    permit the client to communicate with the least one of the separate individual tool or group of tools when the client is authorized to access the least one of the separate individual tool or group of tools, while isolating other individual tools or other groups of tools from the client which are non-authorized,
  wherein:
    when the client is authorized to access the at least one of the separate individual tool or group of tools, the server provides authentication and tool routing information to the client in order to gain access to the at least one separate individual tool or group of tools via the corresponding virtual network, and the authentication and the tool routing information provide access to the corresponding virtual network, while isolating the at least one of the separate individual tool or group of tools from the other individual tools or the groups of tools.

2. The system of claim 1, wherein the server is configured to create a firewall between the client and the server.

3. The system of claim 1, wherein the each separate individual tool or the group of tools are on a private, non-advertised, network.

4. The system of claim 1, wherein the another server is a host server configured to provide client credentials to the server.

5. The system of claim 4, wherein the server receives the credentials from the host server and sends the authentication and the tool routing information to the client based on the credentials.

6. The system of claim 5, wherein the server sends the authentication and the tool routing information directly to the client.

7. The system of claim 5, wherein the server sends the authentication and the tool routing information to the client through the host server.

8. The system of claim 5, wherein the client and server communicate through one of TCP/IP communications, a LAN, and a WAN.

9. The system of claim 1, wherein the server uses Multi-protocol Label Switching (MPLS) technology to set up the at least one virtual network.

10. The system of claim 1, wherein:

the each separate individual tool or the group of tools each have a secure local server that only allows access to a corresponding individual tool or corresponding group of tools in order to provide isolation of the each separate individual tool or the group of tools from one another;

the server is configured to create the separate virtual networks for the each separate individual tool or the group of tools such that routing between the client and the each separate individual tool or the group of tools is independent from one another in order to maintain the isolation of the individual tool or the group of tools from one another and the client is only able to gain access to the individual tool or the group of tools in which the client has authority to access; and the another server is a host server that is aware of the separate virtual networks and is configured to communicate natively with tools or groups of tools through the separate virtual networks.

11. The system of claim 10, wherein:

the host server is aware of the client and the each separate individual tool or the group of tools that the client is authorized to access;

the client engages a client authentication against the host server when the client wants to access the individual tool or the group of tools the client is authorized to access, and the host server is capable of authenticating the client for authorized access; and the host server is further configured that once the client is authenticated, the host server enables all routers with an appropriate label between the host server and the separate virtual network configured for the individual tool or the group of tools that the client wants to gain access to enabling the host server to be a part of the separate virtual network such that the client can access the tool or the group of tools and remain unable to gain access to other individual tools or other groups of tools.

12. The system of claim 1, wherein the server is configured to block off all network traffic going to a private network from systems in an offline room.

13. A method, comprising:

receiving client credentials and tool access information, the tool access information being associated with tools that are vendor specific, proprietary to the vendor, and residing in a private, non-advertised network;

creating a plurality of virtual networks such that a separate virtual network is created for each tool, wherein each tool residing in the private, non-advertised network is an isolated node;

storing information related to each of the plurality of virtual networks and each tool in at least one of the plurality of virtual networks, and the tool access information that provides which virtual network for each tool or tools a client is authorized to access;

receiving a request from the client to gain access to a tool;

accessing the tool via a corresonding virtual network of the plurality of virtual networks;

when the client is authorized to access the tool, sending authentication and routing information to the client in order to permit the client to communicate with the tool, while isolating other individual tools or other groups of tools from the client which are non-authorized; and providing access to the tool in the corresponding virtual network, wherein the access to the tool is provided to a single authenticated tool or tools, while isolating the other individual tools or the other group of tools in the plurality of virtual networks.

14. The method of claim 13, wherein the sending of the authentication and the routing information is sent directly to the client.

15. The method of claim 13, wherein the sending of the authentication and the routing information is sent to the client through a host server.

16. The method of claim 13, further comprising creating a firewall between a server and the client.

17. A computer program product for creating a virtual network in a production facility for private, non-advertised tools, the computer program product including computer program code stored on a computer readable storage memory for causing a computer to implement a method, comprising:

creating a plurality of virtual networks such that a separate virtual network is created for each tool, wherein each tool is vendor specific, proprietary to the vendor, and an isolated node on a private non-advertised network;

storing information related to each of the plurality of virtual networks and each tool in the corresponding virtual network of the plurality of virtual networks, and which virtual network for each tool or tools a client is authorized to access;

receiving a request from the client to gain access to at least one tool;

accessing the at least one tool via a corresponding virtual network of the plurality of virtual networks;

when the client is authorized to access the at least one tool, sending authentication and routing information to the client for the requested at least one tool in the private non-advertised network in order to permit the client to communicate with the tool, while isolating other individual tools or other groups of tools from the client which are non-authorized; and providing access to the requested at least one tool in the corresponding virtual network, wherein the access to the requested at least one tool is provided to a single authenticated tool or tools, while isolating the other individual tools or groups of tools in the plurality of virtual networks.

18. The system of claim 11, wherein the host server is further configured that once the client is authenticated, the host server enables all of the routers with the appropriate labels between the host server, the separate virtual network configured for the individual tool or the group of tools, and the corresponding secure local server that the client wants to gain access to such that the secure local server continues to provide isolation of the individual tool or the group of tools from the other individual tools or other groups of tools.

19. The system of claim 18, wherein the host server is configured to block off all network traffic going to the secure local servers except for network traffic going through the plurality of virtual networks.

20. The system of claim 1, wherein:
the information regarding which separate individual tool or group of tools the client is authorized to access is access credentials;
the another server is further configured to provide the server with information regarding the at least one of the separate individual tool or group of tools that the client requested access to and the access credentials of the client; and
the server is further configured to determine whether the client is authorized to access the at least one of the separate individual tool or group of tools based on the information regarding the at least one of the separate individual tool or group of tools that the client requested access to and the access credentials of the client.

21. The system of claim 20, wherein:
the another server is further configured to:
receive the authentication and tool routing information from the client; and
gain access to the separate individual tool or group of tools that the client requested access to in the corresponding virtual network of the plurality of virtual networks; and
the another server has connection information related to each separate individual tool or group of tools for communicating natively with each separate individual tool or group of tools.

* * * * *